July 26, 1949.　　　O. B. MILLER　　　2,477,075
KNIFE AND TOOL GRINDER
Filed July 11, 1945　　　2 Sheets-Sheet 1
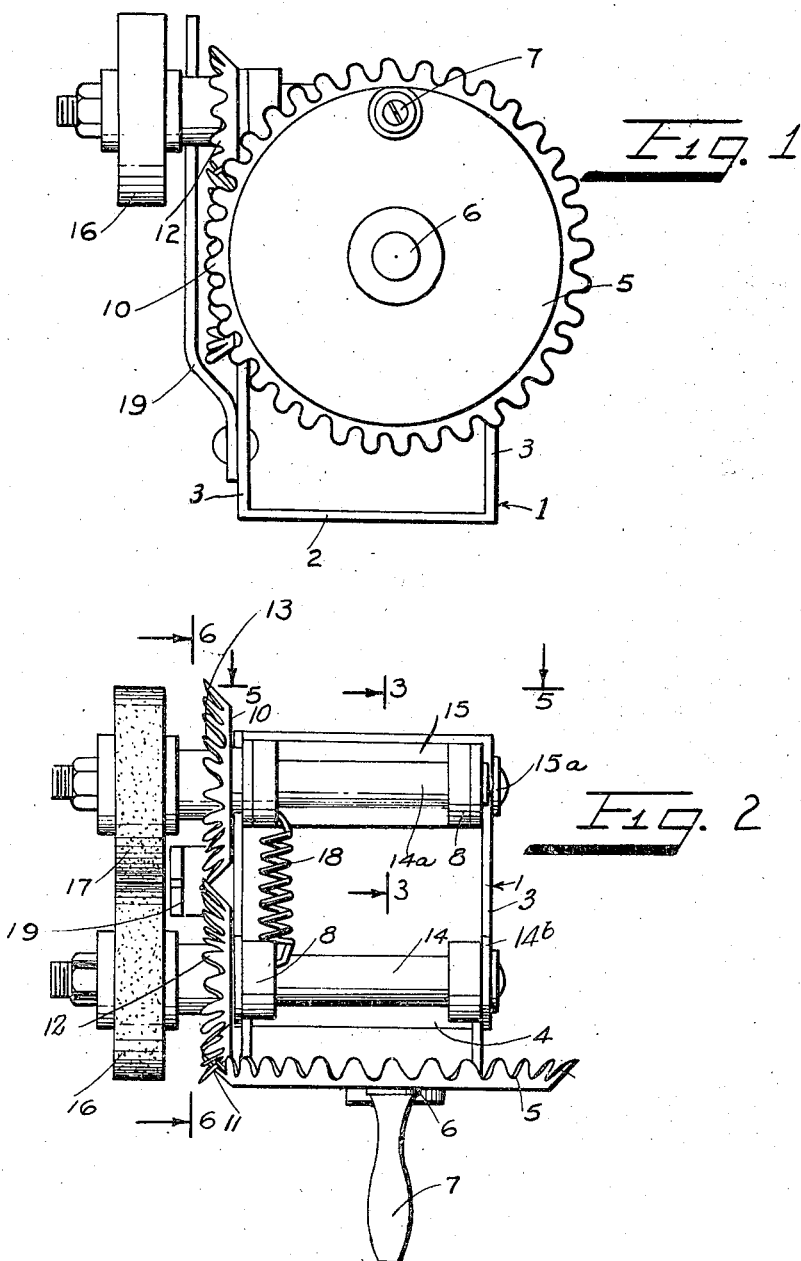
INVENTOR
OLIVER B. MILLER
BY *Victor J. Evans & Co.*
ATTORNEYS July 26, 1949.　　　　O. B. MILLER　　　　2,477,075
KNIFE AND TOOL GRINDER
Filed July 11, 1945　　　　　　　　　2 Sheets-Sheet 2
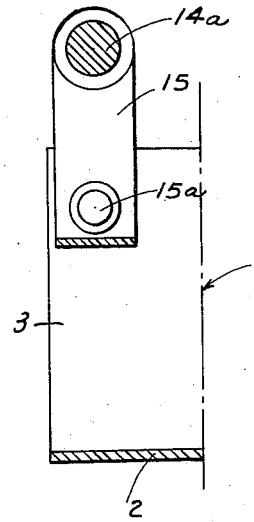
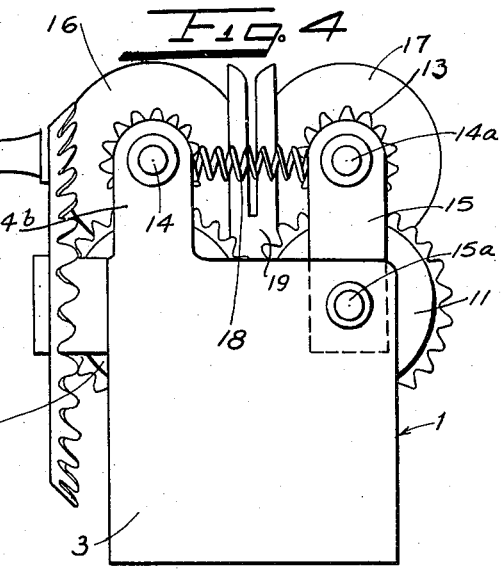
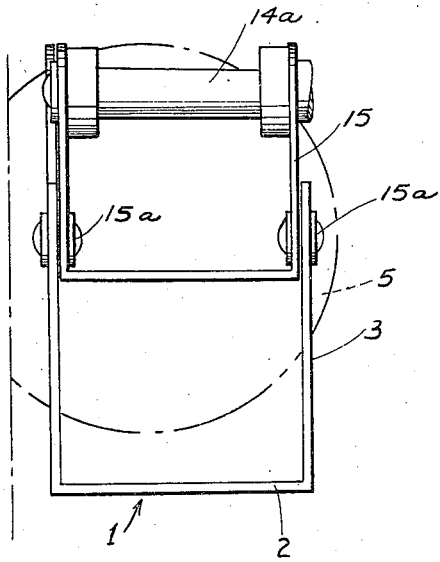
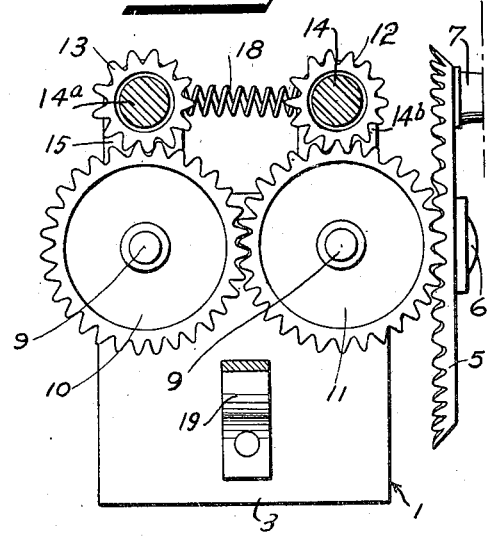
INVENTOR.
OLIVER B. MILLER Patented July 26, 1949

2,477,075

UNITED STATES PATENT OFFICE 2,477,075

KNIFE AND TOOL GRINDER

Oliver B. Miller, Columbus, Nebr.

Application July 11, 1945, Serial No. 604,429

1 Claim. (Cl. 51—80)

My present invention, in its broad aspect, has reference to improvements in grinding machines, and is designed to be a relatively compact, small, and easily operated knife grinder for kitchen and culinary use which may be driven either by hand or an electric motor, and wherein both abrading or grinding wheels are positively driven, and one is adjustable and resiliently held at rim contact with the other so that the wear will be uniform and even. More particularly, it is my purpose to provide a support which may be attached to any suitable base and which carries a pair of spaced parallel shafts provided with constantly intermeshing drive gears, one of which may be connected with a motor, but which may be connected with an operating gear mounted on the base with a suitable crank handle. Another pair of shafts, one of which is carried by the base, and the other carried by a movable U-shaped frame pivoted to one of the first gears, carry driven pinions in mesh with the drive gears and the frame is attached to a coil spring to be resiliently urged toward the first shaft. The shafts carry grinding or abrading wheels which are consequently both positively driven and resiliently held in constant edge to edge contact with each other to wear evenly. A knife is placed in a support and the abrading wheels turned to sharpen and grind the knife in the direction from edge to back. This, briefly, is the simple, sturdy, practical and improved structure by which my novel purposes are accomplished, and my invention has no fragile, or intricate parts or parts likely to become broken, and may be easily operated and kept in a clean and effective condition.

Other and equally important objects and advantages of my invention will be apparent from the following drawings and description, and it is pointed out that changes may be made in form, size, shape, materials, and construction and arrangement of parts and that such changes are within the purview of my broad inventive concept, and the scope of the appended claim.

In the drawings, wherein I have illustrated a preferred form of my invention:

Figure 1 is a side elevation of my knife grinder;

Figure 2 is a top plan view;

Figure 3 is a section on the line 3—3 of Figure 2 and shows the frame for resiliently mounting one shaft and grinding wheel;

Figure 4 is an end view of my invention;

Figure 5 is a view looking in the direction of the arows 5—5 in Figure 2, and shows the frame for resiliently mounting one shaft and grinding wheel; and Figure 6 is a section on the line 6—6 of Figure 2.

In the drawings, wherein like characters are used to designate like or similar parts throughout the several views:

The numeral 1 designates my supporting base which may be set up or attached to any suitable base to support my machine. The base is of U-shaped construction in cross-section — see Figures 1 and 2—and has a bottom 2 and vertical, parallel ends or side walls 3, and a side 4, on which is supported a large operating gear 5 on the stub shaft 6 and which has a crank handle 7. Journalled in bearings not shown in the ends of the base are spaced, parallel shafts 9 which carry constantly intermeshing driven gears 10 and 11, one of which meshes with the operating gear 5, and each of which is in mesh with one of the respective pinions 12 and 13. The pinion 12 is mounted on the shaft 14 journalled in ears 14b extending from the side walls 3, and the other pinion 13 is carried by a shaft 14a on U-shaped pivotally supported frame 15 on bearings 15a on the ends of the base. The shafts have mounted on their ends circular grinding wheels 16 and 17, the edge parts are constantly and resiliently in contact with each other because of the action of the coil spring 18 attached to the pivoted frame 15 as shown in Figures 2, 4 and 6. Rising back of and between the grinding wheels is a bifurcated knife support 19 which is attached to the base as shown in Figures 1 and 2, and into which a knife is placed and the grinding wheels turned in the direction of the edge to place a sharp edge on the same. From the foregoing, it will be seen that both wheels are positively driven, and both wheels have resilient edge contact to provide even wear.

From the foregoing, it is believed that the operation and advantages of my invention will be apparent, but it is again pointed out that interpretation of the scope of my invention should only be conclusive when made in the light of the subjoined claim.

I claim:

A sharpening device comprising in combination a bottom, a pair of opposed side walls extending upwardly therefrom, a pair of aligned ears extending from and in the plane of said respective side walls, a first and a second counter shaft journalled in said side walls parallel to each other, gear means on said respective counter shafts intermeshing with each other, a first driven shaft journalled in said ears parallel to and above said first counter shaft, a substantially U-shaped frame between said side walls and pivotally mounted on said second counter shaft, a second driven shaft journalled in said U-shaped frame, gear means on said first and second driven shafts intermeshing with said gear means on said first and second counter shafts, respectively, grinding wheels secured on said driven shafts, spring means anchored to said U-shaped frame and to one of said ears for biasing said driven shafts toward each other whereby said grinding wheels are maintained in contact with each other, an arm member secured to one of said side walls and extending upwardly between and parallel to the planes of said one of said side walls and said grinding wheels, the end of said arm being slotted in a plane parallel to said driven shafts for receiving and guiding between said grinding wheels an element to be sharpened by said grinding wheels, an end wall extending upwardly from said base perpendicular to said side walls, a driving shaft pournalled in said end wall perpendicular to one of said counter shafts, a driving gear means on said driving shaft intermeshing with the gear means on one of said counter shafts, and crank means on said driving gear means for manually rotating the same.

OLIVER B. MILLER.

REFERENCES CITED

The following references are of record in the file of this patent:

UNITED STATES PATENTS

| Number | Name | Date |
|---|---|---|
| 631,842 | Worden | Aug. 29, 1899 |
| 798,011 | Christie | Aug. 22, 1905 |
| 1,114,908 | Paczigar | Oct. 27, 1914 |
| 1,346,804 | Dilg | July 13, 1920 |

FOREIGN PATENTS

| Number | Country | Date |
|---|---|---|
| 15,451 | Great Britain | Aug. 14, 1894 |